G. T. LEWIS & E. O. BARTLETT.
MANUFACTURE OF DRY WHITE LEAD.
No. 97,936. Patented Dec. 14, 1869.
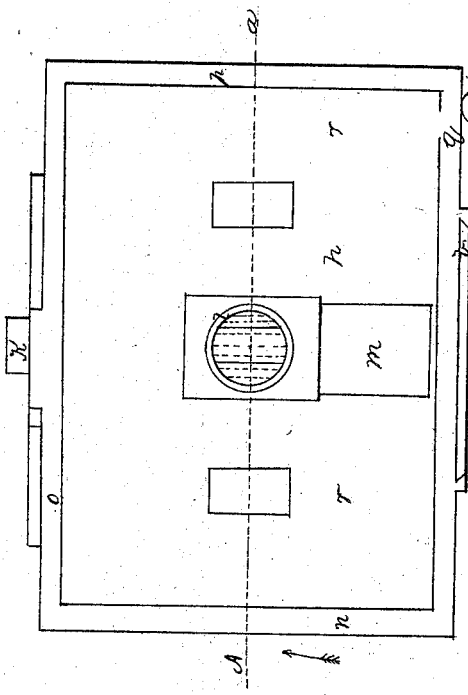
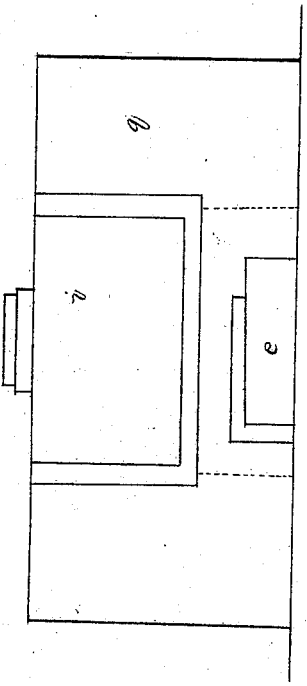
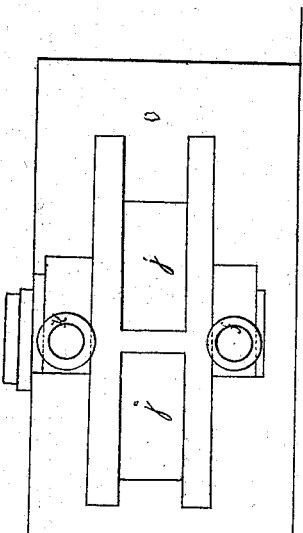
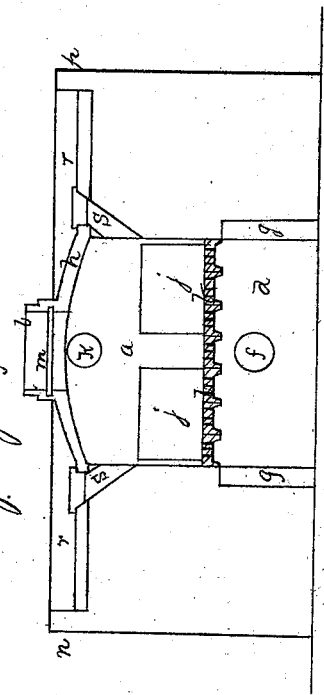

United States Patent Office.

GEORGE T. LEWIS, OF PHILADELPHIA, AND EAYRE O. BARTLETT, OF BIRMINGHAM, PENNSYLVANIA.

Letters Patent No. 97,936, dated December 14, 1869.

IMPROVEMENT IN THE MANUFACTURE OF DRY WHITE LEAD.

The Schedule referred to in these Letters Patent and making part of the same.

*To all whom it may concern:*

Be it known that we, GEORGE T. LEWIS, of Philadelphia, Pennsylvania, and EAYRE O. BARTLETT, of Birmingham, in Woorsmark township, Huntington county, Pennsylvania, have invented a new and useful Improvement in the Manufacture of Dry White Lead and White-Lead Pigment from Metallic Lead; and we do hereby declare that the following is a full and exact description of the same.

Heretofore dry white lead, or the basis of white-lead pigment, has been most generally made from metallic lead, by the use of acetic acid in earthen vessels, immersed in decomposing matter, such as dung or tan.

This treatment requires from five to twelve weeks, the lead being afterwards ground, washed, and dried before it is fit to be used as the basis of a pigment.

The nature of our invention consists in subliming metallic lead and then oxidizing the vapors and collecting them in separate chambers or bags.

We take metallic lead and finely divide it or granulate it, by slowly pouring it, when melted, from a height of from four to six feet, into water, in a state of agitation.

The finely-granulated lead, in small quantities, is then mixed with carbon, preferably fine-washed pea or dust anthracite coal, in the proportion of half and half, and the mixture is then heated in a compound reducing and oxidizing furnace. Dense white fumes or vapors pass off. These are conveyed into a separate chamber or receptacle, where the vapors are strained, by passing through bags or screens of muslin, or other fabric, or are allowed to deposit, by being passed slowly through an extended chamber, in the way in which lamp-black, oxide of zinc, &c., have been heretofore collected.

To prevent the fluxing of the mass together, and otherwise to facilitate the subsequent operations, caustic lime, or the carbonate of lime (in the form of pulverized limestone, or otherwise,) or metallic iron, or its oxides, whether native or artificial, preferably, however, the form known as brown hematite, may be added to the mixture of carbon and granulated lead, in the proportion of about two hundred pounds of lime to every four hundred pounds of the lead. This addition is not essential, although under some circumstances it is desirable and beneficial.

Lead in this condition will form, when mixed with oil, a superior white pigment. It differs from and is superior in quality, as a pigment, to the white oxide of zinc, or anything heretofore produced from mixed metallic ores, or to the oxide of lead produced in the ordinary way, for such purposes as litharge, red lead, or orange mineral are generally applied.

The product obtained by our said process may be used not only as the basis of pigment, but as a drier, and in all manufactures where oxide of lead is desired.

The form of the furnace employed is not material, provided it be so arranged as to evolve metallic vapor, and then oxidize the vapor.

The furnace which we have found to work well for the purposes above mentioned, is commonly known as the Wetherill zinc-furnace, for which Letters Patent of the United States were granted to Samuel Wetherill, November 13, 1855.

This furnace is represented in the annexed drawings, in which—

Figure 1 is a plan of the furnace;
Figure 2, a front elevation;
Figure 3, a back elevation; and
Figure 4, a vertical section on the line A $a$ of fig. 1.

Referring to the drawings—

$a$ is the main chamber, the bottom $b$ of which is composed of iron bars, perforated with small holes of about one-quarter of an inch in diameter, and about one inch apart, and preferably made slightly conical, with the larger diameter downward. The size of the holes would be such as to prevent the crushed ore and coal from falling through.

These perforated bars are suitably sustained at the ends on the front and back wall $c$ $d$.

The ash-pit, below the perforated bottom, is of equal area therewith, and is provided with a door, $e$, in front, and with a hole, $f$, at the back, for the reception of a pipe from suitable blowing apparatus.

The walls $g$ $g$ and arch or top $h$ should be built of some refractory substance, such as fire-brick. The front is entirely open, and provided with sliding doors $i$, by which it can be closed when working the process, or open to remove the residuum, and at the back there are two sliding jams, $j$ $j$, to give access to the main chamber for stirring the charge, and for inspection.

At the back, near the arch, there is a hole, $k$, governed by a sliding damper, leading to a chimney for carrying off smoke and impure gases in the beginning of the operation on a new charge.

In the centre of the roof there is an aperture, $l$, governed by a damper or sliding door, $m$, leading to a suitable apparatus for the collection of the oxidized vapors of lead.

The exterior walls $n$ $o$ $p$ $q$ may be built above the top, to form two feeding-troughs, $r$ $r$, one on each side of the arch or roof, and provided each with an aperture or passage, $s$, leading to the inside or main chamber, and each aperture or passage is provided with a cover, to be put on after the furnace has been charged.

Having thus described our invention,

We claim, and desire to secure by Letters Patent—

1. The manufacture of the basis of a pigment, by mixing finely-divided lead with carbon, and subjecting the mixture to the action of heat in a compound reducing and oxidizing-furnace, and collecting the fumes, as above described.

2. The employment of lime in the form of caustic lime, or the carbonate of lime, or metallic iron, or its oxides, whether native or artificial, in combination with carbon and finely-divided metallic lead, in a compound reducing and oxidizing-furnace, substantially as described.

3. Subliming the metallic lead, oxidizing the vapors, and collecting them as formed in a separate chamber, for the purpose of forming a basis of pigment and for other purposes, substantially as set forth.

4. As a new manufacture, a white oxide of lead, produced by subliming metallic lead and oxidizing the vapors, and collecting them in a separate chamber.

GEORGE T. LEWIS.
EAYRE O. BARTLETT.

Witnesses:
W. A. A. McKinley,
W. W. Dougherty.